United States Patent
Norell et al.

(10) Patent No.: US 10,491,986 B2
(45) Date of Patent: Nov. 26, 2019

(54) MULTI-FUNCTION CONTROL OF ONE OR SEVERAL MULTIMEDIA PLAYBACK DEVICES

(71) Applicant: Zound Industries International AB, Stockholm (SE)

(72) Inventors: Björn Norell, Sundbyberg (SE); Martin Edlund, Enskede (SE); Jonas Groth, Enskede (SE); Carl Ljungh, Farsta (SE)

(73) Assignee: Zound Industries International AB, Stockholm (SE)

(*) Notice: Subject to any disclaimer, the term of this patent is extended or adjusted under 35 U.S.C. 154(b) by 0 days.

(21) Appl. No.: 16/061,607

(22) PCT Filed: Dec. 12, 2016

(86) PCT No.: PCT/EP2016/080612
§ 371 (c)(1),
(2) Date: Jun. 12, 2018

(87) PCT Pub. No.: WO2017/114650
PCT Pub. Date: Jul. 6, 2017

(65) Prior Publication Data
US 2018/0359557 A1     Dec. 13, 2018

Related U.S. Application Data

(60) Provisional application No. 62/271,978, filed on Dec. 28, 2015.

(51) Int. Cl.
*H04R 1/28* (2006.01)
*G06F 3/16* (2006.01)
(Continued)

(52) U.S. Cl.
CPC ......... *H04R 1/2803* (2013.01); *G06F 3/0362* (2013.01); *G06F 3/165* (2013.01);
(Continued)

(58) Field of Classification Search
None
See application file for complete search history.

(56) References Cited

U.S. PATENT DOCUMENTS 6,741,273 B1   5/2004  Waters et al.
7,223,926 B1   5/2007  Gannon et al.
(Continued)

FOREIGN PATENT DOCUMENTS

CN    104160720 A    11/2014
EP    1585015        10/2005
(Continued)

OTHER PUBLICATIONS

Communication pursuant to Article 94(3) EPC for European Application No. 16 820 189.5 dated May 24, 2019.
(Continued)

*Primary Examiner* — Mark Fischer
(74) *Attorney, Agent, or Firm* — Knobbe Martens Olson & Bear LLP (57) ABSTRACT

The present disclosure generally concerns multi-function control of one or several audio playback devices, such as one or several speakers of a home music system. In one example embodiment described herein, a user interface arrangement for controlling multiple functions of one or several audio playback devices comprises first and second rotatable knobs (110A; 110B). The first rotatable knob (100A) has a first rotational axis extending in a first axial direction, wherein the first rotatable knob (100A) is rotatable around said first rotational axis to control a first function and wherein the first rotatable knob (100A) is further configured to be displaced
(Continued)

axially in said first axial direction of the first rotational axis to control a second function. Furthermore, the second rotatable knob (HOB) has a second rotational axis extending in a second axial direction, wherein the second rotatable knob (HOB) is rotatable around said second rotational axis to control a third function and wherein the second rotatable knob (HOB) is further configured to be displaced axially in said second axial direction of the second rotational axis to control a fourth function.

23 Claims, 4 Drawing Sheets (51) Int. Cl.
*G06F 3/0362* (2013.01)
*H04R 1/02* (2006.01)
*H04R 1/00* (2006.01)
*H04R 1/10* (2006.01)

(52) U.S. Cl.
CPC .............. *H04R 1/00* (2013.01); *H04R 1/025* (2013.01); *H04R 1/1041* (2013.01); *H04R 2420/00* (2013.01)

(56) References Cited

U.S. PATENT DOCUMENTS

| | | |
|---|---|---|
| 7,592,562 B1 | 9/2009 | Vanderwege et al. |
| 2001/0028721 A1 | 10/2001 | Stavrou |
| 2006/0220929 A1* | 10/2006 | Aiso ..................... G06F 3/0362 341/50 |
| 2007/0087686 A1* | 4/2007 | Holm ....................... H04S 7/30 455/3.06 |
| 2009/0079712 A1* | 3/2009 | Levin ..................... G05G 9/047 345/184 |
| 2013/0022221 A1 | 1/2013 | Kallai et al. |
| 2013/0094667 A1 | 4/2013 | Millington et al. |
| 2013/0177186 A1 | 7/2013 | Schul |
| 2013/0249814 A1 | 9/2013 | Zeng |

FOREIGN PATENT DOCUMENTS

| | | |
|---|---|---|
| EP | 2933811 | 10/2015 |
| EP | 3 125 649 | 2/2017 |
| JP | 2000 149720 | 5/2000 |
| KR | 20100017860 | 2/2010 |
| WO | WO 99/40537 | 8/1999 |
| WO | WO 99/49443 | 9/1999 |

OTHER PUBLICATIONS

First Office Action in Chinese Patent Application No. 201680076544.3 dated Apr. 11, 2019.

* cited by examiner

MULTI-FUNCTION CONTROL OF ONE OR SEVERAL MULTIMEDIA PLAYBACK DEVICES

CROSS REFERENCE TO RELATED APPLICATIONS

This application is a U.S. National Phase Application of PCT International Application Number PCT/EP2016/080612, filed on Dec. 12, 2016, designating the United States of America and published in the English language, which claims the benefit of priority to U.S. Provisional Patent Application No. 62/271,978, filed on Dec. 28, 2015. The disclosures of the above-referenced applications are hereby expressly incorporated by reference herein in their entireties.

TECHNICAL FIELD

The present disclosure generally relates to playback of media and, more particularly, playback of audio such as music.

More specifically, the present disclosure presents a user interface arrangement for controlling multiple functions of one or several audio playback devices. Also, an audio playback device comprising the user interface arrangement is disclosed herein. Furthermore, a user interface panel comprising the user interface arrangement is disclosed herein.

BACKGROUND

In recent years, digital music has become available to many people. For example, technology developments have allowed people to listen to audio such as digital music on personal audio devices. The consumers' increasing preference for audio such as digital music has also resulted in the integration of personal audio devices into mobile telephones (e.g., smart phones) and other mobile devices (e.g., tablet computers). The portability of these devices has enabled people to bring their music experience with them anywhere and at any time. Furthermore, people have become able to consume streamed audio such as streamed digital music in their homes through the use of their computers or similar devices. Thanks to the rapid development in communication network technology which has increased the speed and reliability with which audio can be streamed over computer networks, the usage of and listening to streamed audio in home environments has also increased in recent years.

In recent years, various systems and methods for networked audio playback have also been developed. Wired or wireless networks can be used to connect one or more multimedia playback devices for a home or other location playback network (e.g., a home music system). Certain systems and methods provide automatic configuration of parameters of a playback device to be coupled to a network with reduced or minimum human intervention. For example, a wired and/or wireless ad-hoc network may be established to facilitate communications among a group of devices. Music and/or other multimedia content can therefore be shared among devices and/or groups of devices (also sometimes referred to as zones) associated with a playback network. Certain systems and methods thus facilitate streaming of music (or otherwise providing of music) from a music-playing application (e.g., browser-based application, native music player, other multimedia application, and so on) to a multimedia content playback system (e.g., Sonos™).

Even though it is common that today's multimedia playback devices (e.g., audio playback devices such as speakers) have direct access to the network and different content providers (e.g. Spotify®) these devices are typically dependent on a connected screen based device (e.g., a mobile phone or a tablet computer) to interact and control the various multimedia play back devices. The screen based devices typically include touch-sensitive display screens that allow users to interact with and send commands to control the connected multimedia play back device(s) for playback of multimedia. Touch-sensitive display screens are generally perceived as attractive, e.g., because they are intuitive to users. Thus touch-sensitive display screens are also perceived as user-friendly.

SUMMARY

It is in view of the above considerations and others that the various embodiments of the present disclosure have been made.

The present disclosure recognizes the fact that, at least in some scenarios, the usage of screen based devices may result in that unnecessarily many steps are needed for the interaction between the user and the screen based device to control the connected multimedia play back device(s).

Generally, there is therefore a need to provide a solution for controlling multiple functions of one or several multimedia playback devices that is easy-to-use and, at the same time, facilitates the interaction between user and the playback of multimedia at the one or several multimedia playback devices.

Accordingly, a general object is to provide a solution for controlling multiple functions of one or several multimedia playback devices that is easy-to-use and, at the same time, facilitates the interaction between user and the playback of multimedia at one or several multimedia playback devices. This general object has been addressed by the appended independent claims. Advantageous embodiments are described in the dependent claims.

In the following, the multimedia playback device(s) will be exemplified as audio playback device(s). This should, however, not be interpreted as limiting the scope of the various embodiments described throughout this disclosure.

In a first of its aspects, this disclosure presents a user interface arrangement for controlling multiple functions of one or several audio playback devices. In an advantageous embodiment, the user interface arrangement comprises first and second rotatable knobs. For example, the user interface arrangement may comprise more than one knob and less than three knobs. That is, the user interface arrangement may contain two knobs.

A first rotatable knob has a first rotational axis extending in a first axial direction. The first rotatable knob is rotatable around said first rotational axis to control a first function. Also, the first rotatable knob is configured to be displaced axially in said first axial direction of the first rotational axis to control a second function. A second rotatable knob has a second rotational axis extending in a second axial direction. The second rotatable knob is rotatable around said second rotational axis to control a third function. Also, the second rotatable knob is configured to be displaced axially in said second axial direction of the second rotational axis to control a fourth function.

Hereby, the first and second rotatable knobs are enabled to collaboratively control multiple functions of the one or several audio playback devices. As will be appreciated, it is possible to control many different functions of the one or several audio playback devices by using only two rotatable knobs. In other words, only few components are needed for the multi-function control of the audio playback device(s). This contributes to a solution that is intuitive and easy to use.

In one embodiment, the first function includes a volume function.

In one embodiment, the second function includes a selection function to select between two playback modes. For example, a first playback mode may include playing media (e.g., audio) at one single audio playback device (sometimes referred to as "solo" mode) and a second playback mode includes playing media (e.g., audio) at several audio playback devices (sometimes referred to as "multi" mode).

In one embodiment, the third function includes a selection function to select a media source of the media to be played. The media source may be an audio source of audio to be played.

In one embodiment, the fourth function includes a function which is dependent on a current setting, i.e. selection, of the third function.

The audio interface arrangement may be operatively connected to a processor. This processor may be operatively connected to a memory comprising instructions which are executable by said processor as well as a communications interface configured for wired or wireless communication with said one or several audio playback devices. A rotation of the first rotatable knob around the first rotational axis may cause a first signal to be transmitted to the processor for controlling said first function. Also, an axial displacement of the first rotatable knob in said first axial direction may cause a second signal to be transmitted to the processor for controlling said second function. Furthermore, a rotation of the second rotatable knob around the second rotational axis may cause a third signal to be transmitted to the processor for controlling said third function. Moreover, an axial displacement of the second rotatable knob in said second axial direction may cause a fourth signal to be transmitted to the processor for controlling said fourth function.

In alternative embodiments, the user interface arrangement comprises only the first knob. That is, the second rotatable knob may be omitted. As will be appreciated, it is thus not necessary to provide several knobs. In some embodiments, it may hence be sufficient to provide the first rotatable knob only.

In a second of its aspects, this disclosure presents an audio playback device comprising the user interface arrangement according to the first aspect.

In some embodiments, a system of audio play back devices may be provided. The audio playback device may be a master audio playback device whereas the other audio playback devices may be slave audio playback devices. The audio playback devices may then be configured to be controlled by the master audio playback device. In other words, the master play back device is an audio playback device configured to act as a master and, accordingly, control the other audio playback devices (i.e., the slave audio playback devices).

Advantageously, an audio playback device is embodied as a speaker, or loudspeaker. In other words, the audio playback device may be an electro acoustic transducer, i.e. a device which is capable of converting an audio signal into a corresponding sound.

In a third of its aspects, this disclosure presents a user interface panel comprising the user interface arrangement according to the earlier-described first aspect. The user interface panel may, for example, be attachable to house equipment such as a wall to name only one example.

By providing a user interface arrangement comprising a rotatable knob as defined hereinabove it is made possible to control multiple functions with only one component. This contributes to a solution for controlling various functions of a multimedia playback system (e.g., a home music system) that is both intuitive and easy-to-use. For example, in one advantageous embodiment the provision of one rotatable knob allows for controlling a volume function as well as a playback mode selection function (e.g., choice between "solo" and "multi" modes).

Furthermore, the provision of first and second rotatable knobs as described hereinabove makes it possible to collaboratively control multiple functions (i.e., a plurality of functions) of one or several audio playback devices, such as speakers. Indeed, it is made possible to control (very) many different functions of the one or several audio playback devices by using only two rotatable knobs. As will be appreciated, (very) few components are therefore needed to enable the multi-function control of the audio playback device(s). This contributes to a solution for controlling various functions of a multimedia playback system (e.g., a home music system) that is both intuitive and easy-to-use.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

Figure 1:
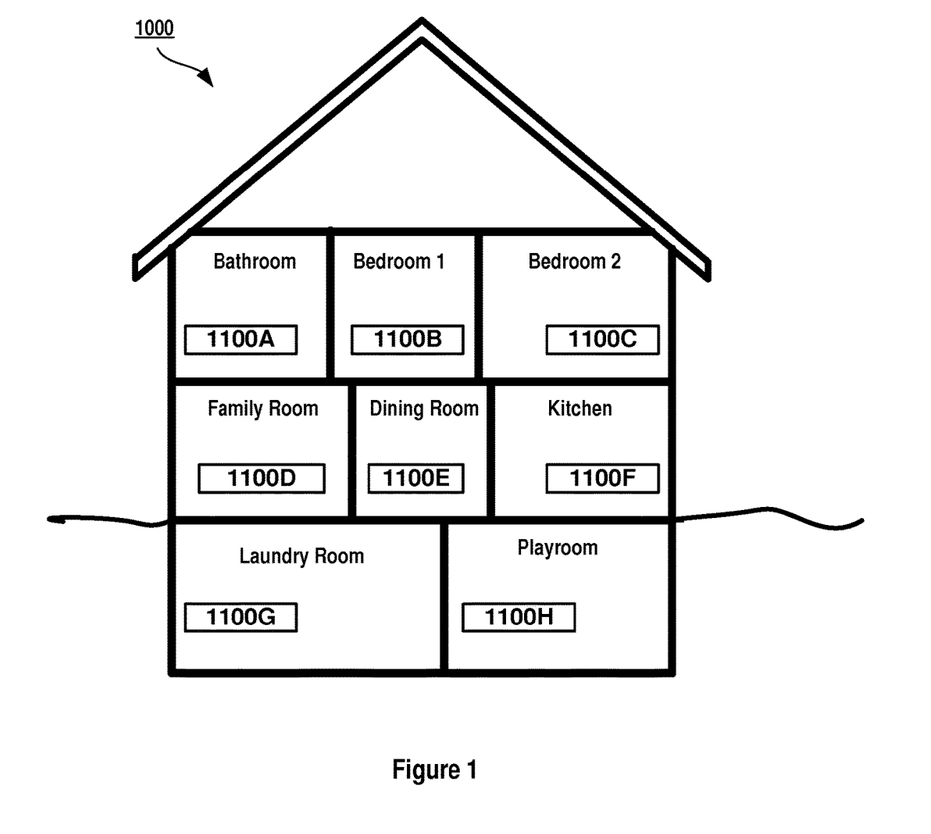
FIG. 1 schematically illustrates an example environment, such as a home audio system (e.g., a home music system), where embodiments disclosed herein may be practiced.

FIG. 1 shows an example system configuration 1000, or example environment, in which one or more of the embodiments disclosed herein can be practiced or implemented. By way of illustration, this example system configuration 1000 represents a home with multiple zones. Each zone may, for example, represent a different room or space, such as an office, bathroom, bedroom, kitchen, dining room, family room, playroom, or laundry room. While not shown in FIG. 1, a single zone can cover more than one room or space. One or more of audio playback devices 1100A, 1100B, 1100C, . . . , 100n are shown in each respective zone. An audio playback device 1100A-1100n, also referred to as a multimedia playback device, speaker, and so on, provides audio and optionally also video and/or audiovisual output. As will be appreciated upon reading the present disclosure, one of the audio playback devices 1100A-1100n (e.g., the audio playback device 1100D in the family room) is configured to act as a master audio playback device. Accordingly, the remaining audio playback devices of the example system configuration 1000 may be configured to act as slave audio playback devices. As will be appreciated, the master audio playback device is configured to act as a master and, accordingly, control the other audio playback devices (i.e., the slave audio playback devices). The audio playback device acting as the master hence provides control to the system configuration 1000. The system configuration 1000 illustrates an example whole house audio system, though it is appreciated that the embodiments described herein are not limited to this particular application or to an expansive system like a whole home audio system 1000 as schematically illustrated in FIG. 1.

Figure 2:
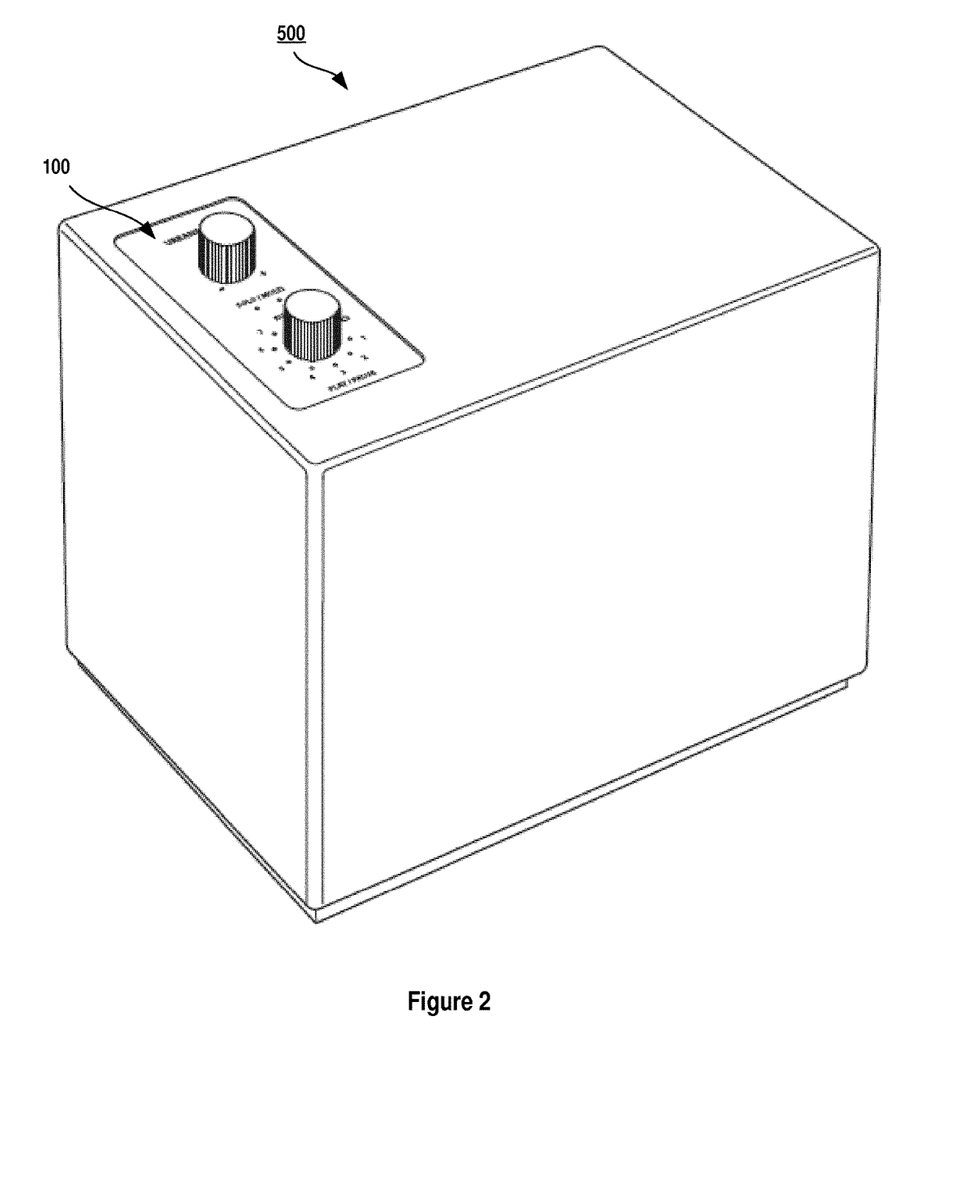
FIG. 2 shows an example embodiment of an audio playback device, here embodied as a speaker.
Figure 3A:
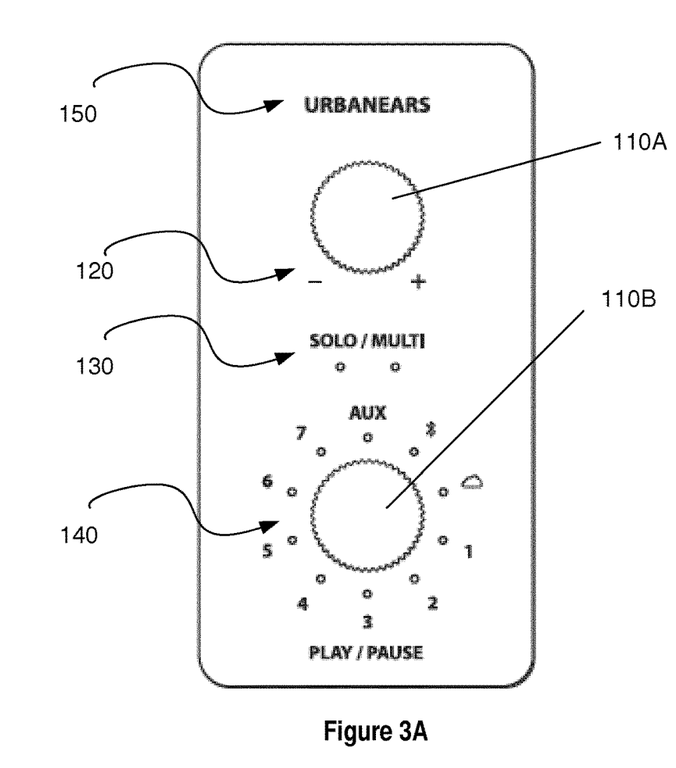
FIG. 3A is a front view of a user interface arrangement in accordance with an embodiment.
Figure 3B:
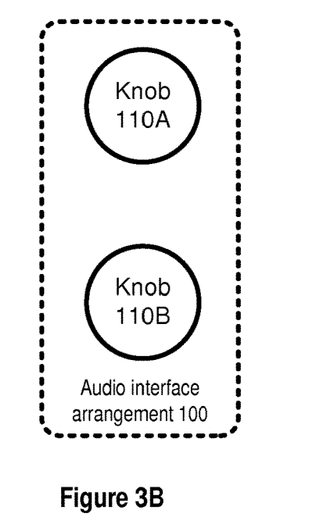
FIG. 3B is another front view of the user interface arrangement of FIG. 3A.
Figure 3C:
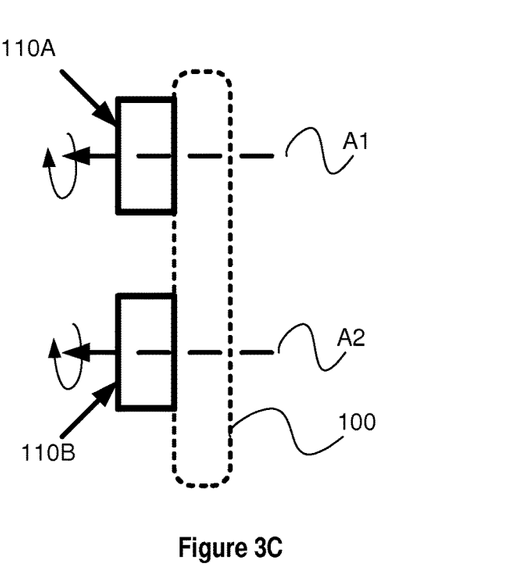
FIG. 3C is a side view of the user interface arrangement of FIG. 3B.

FIG. 2 schematically illustrates an example embodiment of the present invention. An audio playback device 500, here exemplified as a speaker, comprises a user interface arrangement 100. FIG. 3A schematically illustrates one example embodiment of the user interface arrangement shown in FIG. 2. FIGS. 3B and 3C schematically illustrate first and second knobs 110A, 100B, respectively, of the user interface arrangement 100. FIG. 3A is a front view of the first and second knobs 110A and 110B, whereas FIG. 3B is a side view of the first and second knobs 110A and 110B. The audio playback device 500 shown in FIG. 2 is configured to act as a master audio playback device in a system of audio playback devices including the master audio playback device 500 and several slave audio playback devices (see FIG. 1), all of which are configured to be controlled by the master audio playback device 500.

With continued reference to FIG. 2 and FIGS. 3A-3C, an example user interface arrangement 100 for controlling multiple functions of one or several audio playback devices will be described in further detail.

A first rotatable knob 100A has a first rotational axis A1 (see FIG. 3C) extending in a first axial direction. The first rotatable knob 100A is rotatable around this first rotational axis A1 to control a first function. As an example, the first function may be a volume function. For example, rotating the first rotatable knob 110A clockwise may increase the volume and rotating the first rotatable knob 110A counter-clockwise may decrease the volume. In some embodiments, the user interface arrangement 100 may comprise a visual indication 120. For example, the visual indication 120 may comprise a textual information "−" and/or "+" to indicate the rotational directions of decreasing/increasing the volume.

The first rotatable knob 100A is additionally configured to be displaced axially in the first axial direction of the first rotational axis A1 to control a second function. Advantageously, the second function includes a selection function to select between two playback modes. A first playback mode may include playing audio at one single audio playback device. Typically, but not necessarily, this single audio playback device is the master audio playback device 500 itself. The first playback mode may hence be referred to as "Solo". Furthermore, a second playback mode may include playing audio at several audio playback devices. The second playback mode may hence be referred to as "Multi". As will be appreciated, by pressing/depressing the first rotatable knob 110A, it is made possible for the user to switch between the two playback modes "Solo" and "Multi", respectively. When in "Solo" mode, a rotation of the first rotatable knob 110A may control the volume of the audio playback device 500 individually. When in "Multi" mode, a rotation of the first rotatable knob 110A may e.g. control the volume of the audio playback device 500 itself as well as the volume of one or several (e.g., all) connected audio playback devices of a system of audio playback devices.

In some embodiments, the user interface arrangement 100 may comprise a visual indication 120. For example, the visual indication 120 may comprise a textual information "SOLO" and/or "MULTI" to indicate the earlier-mentioned playback modes. Also, the textual information (i.e., "SOLO" and/or "MULTI") may be accompanied with a visual indicator, here exemplified by Light Emitting Diodes (LEDs). In one embodiment, the visual indication 120 is configured to give visual indications of detected events occurring in the audio playback device 500 as a prompt for potential human interaction with the user interface arrangement 100.

A second rotatable knob 110B is also provided at the user interface arrangement 100. The second rotatable knob 110B has a second rotational axis A2 (see FIG. 3C) that extends in a second axial direction. The second rotatable knob 110B is rotatable around the second rotational axis A2 to control a third function. In advantageous embodiments, this third function includes a selection function to select a media source (e.g., audio source) of the media (e.g., audio) to be played. Furthermore, the second rotatable knob 110B is additionally configured to be displaced axially in said second axial direction of the second rotational axis A2 to control a fourth function. In preferred embodiments, the fourth function may include a function which is dependent on a current setting (or, selection) of the third function. For example, the second rotatable knob 110B may be rotated clockwise (or, counter-clockwise) to select, or choose, a certain audio source (e.g., channel "1") and by subsequently pressing (i.e., displacing) the second rotatable knob 110B it is made possible for the user to activate the thus made choice/selection of the audio source (e.g., channel 1 in this example).

In the embodiment schematically illustrated in FIG. 3A, there are ten possible selections (or, selectable options), here exemplified by numbers 1-7, AUX, BLUETOOTH, and CLOUD. As can be seen in FIG. 3A, the user interface arrangement 100 may comprise a visual indication 140. For example, the visual indication 140 may comprise textual information to indicate the earlier-mentioned selection possibilities 1-7, AUX, BLUETOOTH, and CLOUD. Also, the textual information (i.e., 1-7, AUX, BLUETOOTH, and CLOUD) may be accompanied with a respective visual indicator, here exemplified by Light Emitting Diodes (LEDs). The behavior of the LEDs in order to give the user appropriate visual indications of detected selections, e.g. as a prompt for potential human interaction with the user interface arrangement 100, may be varied in many ways. For example, in one embodiment, when a user selects a new source by turning the second rotatable knob 110B, the selected source may be indicated by a dimmed light of the accompanying LED. The LED indicating the currently playing source may still have a steady light. For instance, not until the new source has been activated (by pressing the second rotatable knob 110B) the LED light will then be steady and the previous source LED light will be turned off. As will be appreciated, the LED behavior may be varied in many ways depending on user demands and other possible system requirements.

In the embodiment illustrated in FIG. 3A, the selectable options are:
AUX
Bluetooth
Cloud (e.g., streamed content (such as audio) over a networks, e.g. Spotify® or Internet Radio)
Preset 1-7

These channels, or options, may be pre-set by the user. Hence, the user may for example assign favorite playlists (e.g., playlists of Spotify® or channels of Internet Radio) to each one of the seven pre-set channels. In some embodiments, the pre-set channels may be automatically configured by the audio playback device the first time the user uses the audio play back device. For example, the pre-sets could be auto-generated on the basis of which audio the user usually listens to.

In some embodiments, the displacement of the second rotatable knob 110B may have different functionality depending on which option of the ten selectable options that has been selected. For example, in one example embodiment, the user interface arrangement 100 may be pre-configured with the following functionality:
AUX—short press to select source.
Bluetooth—short press to select source and to set the audio playback device 500 into pairing mode. Once activated/connected, short press plays or pauses the current audio. Double press to skip audio song. Triple press to play previous song. Long press to set Bluetooth into discoverable mode.
Cloud—short press to activate. Once activated short press plays or pauses the current audio. Double press to skip song. Triple press to play previous song. Long press to set speaker into wifi-setup mode.
Preset 1-7—short press to activate the selected preset option. Once activated short press plays or pauses the current audio. Double press to skip song. Triple press to play previous song. It might also be possible to save the currently playing audio on one of the desired presets 1-7 by a long press.

As can be seen in FIG. 3A, the user interface arrangement 100 may optionally also include textual information 150 to indicate the brand, or trademark, of the audio playback device 500. In this example, the brand name is URBANEARS which is a brand of the applicant of the present patent application.

Figure 4:
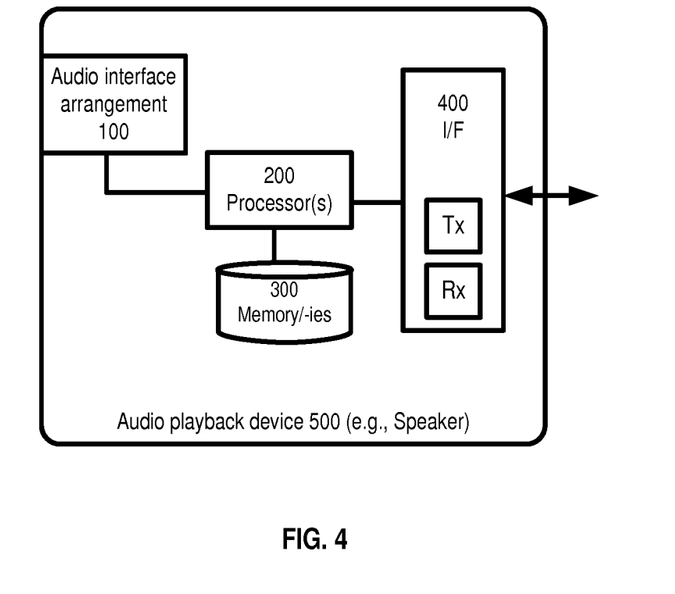
FIG. 4 shows one example implementation of an audio playback device comprising an embodiment of any of the user interface arrangements of FIGS. 3A-3C.

Reference is now made to FIG. 4, which schematically illustrates one example embodiment of the audio playback device 500 shown in FIG. 2. The audio playback device 500 is preferably, though not necessarily, a speaker. In this example embodiment, the audio playback device 500 comprises one or more processors 200 and one or more memories 300. Also, a communications interface 400, or a communications circuitry, is provided in order to allow the audio playback device 500 to communicate with other audio playback devices, electronic devices and/or servers and/or media presentation systems, e.g. via a network (such as the Internet). To this end, the communications interface 400 may comprise a transmitter (Tx) and a receiver (Rx). Alternatively, the communications interface 400 may comprise a transceiver (Tx/Rx) combining both transmission and reception capabilities. The communications interface 400 may include a radio frequency (RF) interface allowing the audio playback device 500 to communicate with other audio playback devices, electronic devices and/or servers and/or media presentation systems through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The audio playback device 500 also comprises the user interface arrangement 100 as described earlier in this disclosure. The audio interface arrangement 100 is operatively connected to the one or more processors 200. The one or more processors 200 are operatively connected to the one or more memories 300. The one or more memories comprise(s) instructions which are executable by the one or more processors 200.

According to this example embodiment, a rotation of the first rotatable knob 110A around the first rotational axis A1 causes a first signal to be transmitted to the processor(s) 200 for controlling the earlier-mentioned first function. Furthermore, an axial displacement of the first rotatable knob 110A in said first axial direction causes a second signal to be transmitted to the processor(s) 200 for controlling the earlier-mentioned second function. Moreover, a rotation of the second rotatable knob 110B around the second rotational axis A2 causes a third signal to be transmitted to the processor(s) 200 for controlling the earlier-mentioned third function. Still further, an axial displacement of the second rotatable knob 110B in said second axial direction causes a fourth signal to be transmitted to the processor(s) 200 for controlling said fourth function.

In particularly advantageous embodiments, the user interface arrangement 100 of the audio playback device 500 contains two rotatable knobs 110A, 110B. That is, the user interface arrangement 100 has more than one but less than three rotatable knobs.

By providing a user interface arrangement 100 comprising first and second rotatable knobs 110A, 110B as described hereinabove it is made possible to collaboratively control multiple functions (i.e., a plurality of functions) of one or several audio playback devices, such as speakers. Indeed, it is made possible to control many different functions of the one or several audio playback devices by using only two rotatable knobs. As will be appreciated, very few components are therefore needed to enable the multi-function control of the audio playback device(s). This contributes to a solution for controlling various functions of a multimedia playback system (e.g., a home music system) that is intuitive, easy-to-use and non-complex.

As will be appreciated, it is not necessary that the user interface arrangement 100 is part of an audio playback device 500, such as a speaker.

Figure 5:
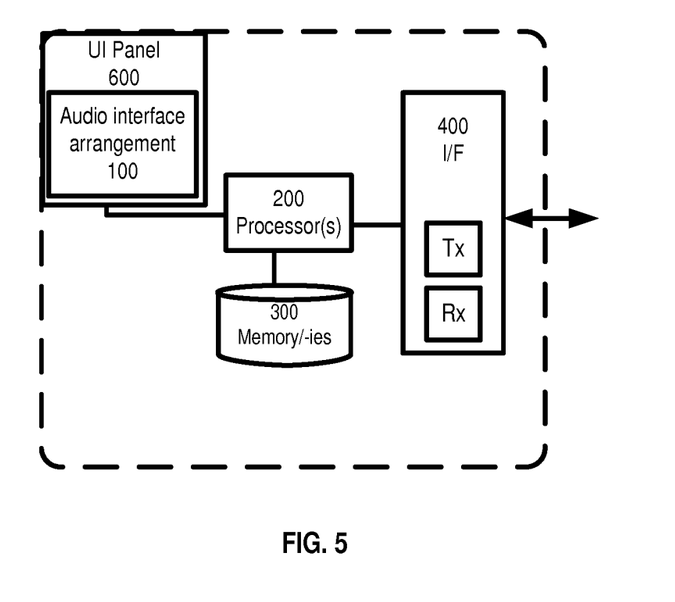
FIG. 5 shows another example implementation where a user interface panel comprises an embodiment of any of the user interface arrangements of FIGS. 3A-3C.

In alternative embodiments, such as the example embodiment schematically illustrated in FIG. 5, a user interface panel 600 comprises the user interface arrangement 100. The user interface panel 600 may be attachable to house equipment, such as a housing wall. This way, it is made possible for a user to control multiple functions of an individual audio playback device 500 or several audio playback devices by interaction with the two rotatable knobs 110A, 100B of the user interface arrangement 100 of said user interface panel 600.

In some embodiments, it is possible to complement the audio playback device 500 of FIGS. 2-4 with a remote control of the audio playback device 500. To this end, a method of remotely controlling the audio playback device 500 may be provided. The method may be performed by an electronic device (not shown), such as a mobile telephone (e.g., a smart phone) or a tablet computer, having one or more processors and memory storing one or more programs for execution by the one or more processors. For example, the one or more programs may include instructions that when executed by the one or more processors control the operation of the electronic device. For example, upon execution of said instructions by the one or more processors, this may cause the electronic device to remotely control functions that are controllable by means of the user interface arrangement 100 of the audio playback device.

The present disclosure has presented various embodiments for multi-function control of one or several multimedia playback devices, such as speakers (e.g., wifi-connected speakers). By providing a user interface arrangement 100 having first and second rotatable knobs 100A, 100B as described hereinabove it is made possible to collaboratively control a plurality of functions at one single audio playback device or at several audio playback devices. It is made possible to control many different functions of the one or several audio playback devices by using only two rotatable knobs. Few components are hence needed to enable the multi-function control of the audio playback device(s). This contributes to a solution for controlling various functions of a multimedia playback system (e.g., a home music system) that is intuitive, easy-to-use and/or non-complex.

SELECTED NUMBERED EXAMPLE EMBODIMENTS

The technology disclosed herein thus encompasses without limitation the following non-limiting Numbered Example Embodiments (NEE):

NEE1. A user interface arrangement (100) for controlling multiple functions of one or several audio playback devices, wherein the user interface arrangement (100) is characterized by:
a first rotatable knob (100A) having a first rotational axis (A1) extending in a first axial direction, wherein the first rotatable knob (100A) is rotatable around said first rotational axis (A1) to control a first function and wherein the first rotatable knob (100A) is further configured to be displaced axially in said first axial direction of the first rotational axis (A1) to control a second function.

NEE2. The user interface arrangement (100) according to NEE1, further comprising:
a second rotatable knob (110B) having a second rotational axis (A2) extending in a second axial direction, wherein the second rotatable knob (110B) is rotatable around said second rotational axis (A2) to control a third function and wherein the second rotatable knob (110B) is further configured to be displaced axially in said second axial direction of the second rotational axis (A2) to control a fourth function.

NEE3. The user interface arrangement (100) according to NEE2, wherein the user interface arrangement (100) contains two rotatable knobs.

NEE4. The user interface arrangement (100) according to any one of NEE1-NEE3, wherein the first function includes a volume function.

NEE5. The user interface arrangement (100) according to any one of NEE1-NEE4, wherein the second function includes a selection function to select between two playback modes.

NEE6. The user interface arrangement (100) according to NEE5, wherein a first playback mode includes playing audio at one single audio playback device and wherein a second playback mode includes playing audio at several audio playback devices.

NEE7. The user interface arrangement (100) according to NEE2, NEE3 or any one of NEE4-NEE6 when dependent on NEE2, wherein the third function includes a selection function to select an audio source of the audio to be played.

NEE8. The user interface arrangement (100) according to NEE7, wherein the fourth function includes a function which is dependent on a current setting of the third function.

NEE9. The user interface arrangement (100) according to any one of NEE 1-8, wherein the audio interface arrangement (100) is operatively connected to a processor (200), wherein the processor (200) is operatively connected to:
a memory (300) comprising instructions which are executable by said processor (200); and
a communications interface (400) configured for wired or wireless communication with one or several audio playback devices; wherein
a rotation of the first rotatable knob (110A) around the first rotational axis (A1) causes a first signal to be transmitted to the processor (200) for controlling said first function;
an axial displacement of the first rotatable knob (110A) in said first axial direction causes a second signal to be transmitted to the processor (200) for controlling said second function.

NEE10. The user interface arrangement (100) according to NEE9 when dependent on NEE2, wherein:
a rotation of the second rotatable knob (110B) around the second rotational axis (A2) causes a third signal to be transmitted to the processor (200) for controlling said third function;
an axial displacement of the second rotatable knob (110B) in said second axial direction causes a fourth signal to be transmitted to the processor (200) for controlling said fourth function.

NEE11. An audio playback device (500) comprising the user interface arrangement (100) according to any one of NEE1-NEE10.

NEE12. The audio playback device (500) according to NEE11, wherein the audio playback device (500) is a master audio playback device in a system of audio playback devices including the master audio playback device (500) and several slave audio playback devices, all of which are configured to be controlled by the master audio playback device (500).

NEE13. The audio playback device (500) according to NEE11 or NEE12, wherein the audio playback device (500) is a speaker.

NEE14. A user interface panel (600) comprising the user interface arrangement (100) according to any one of NEE1-NEE10.

NEE15. The user interface panel (600) according to NEE14, wherein the user interface panel (600) is attachable to house equipment.

NEE16. The user interface panel (600) according to NEE15, wherein the house equipment is a wall.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while different controllable functions have been described herein one of ordinary skill in the art will recognize that other functions may also be possible. Hence, it will be appreciated that the functions described herein may be varied in dependence of e.g. user demands and/or system requirements. Furthermore, although specific terms may be employed herein, they are used in a generic and descriptive sense only and not for purposes of limitation. Therefore, a person skilled in the art would recognize numerous variations to the described embodiments that would still fall within the scope of the disclosure. As used herein, the terms "comprise/ comprises" or "include/includes" do not exclude the presence of other elements or steps. Furthermore, although individual features may be included in different numbered example embodiments, these may possibly advantageously be combined, and the inclusion of different numbered example embodiments does not imply that a combination of features is not feasible and/or advantageous. In addition, singular references do not exclude a plurality.

The invention claimed is:

1. A user interface arrangement configured to control multiple functions of one or more audio playback devices of a plurality of playback devices in a networked audio playback system, the user interface arrangement comprising:
   a first rotatable knob having a first rotational axis extending in a first axial direction, wherein the first rotatable knob is rotatable around the first rotational axis to control a first function, and the first rotatable knob is configured to be displaced axially in the first axial direction of the first rotational axis to control a second function; and
   a second rotatable knob having a second rotational axis extending in a second axial direction, wherein the second rotatable knob is rotatable around the second rotational axis to control a third function, and the second rotatable knob is configured to be displaced axially in the second axial direction of the second rotational axis to control a fourth function,
   wherein the first function includes a volume function, the second function includes a selection function to select between a plurality of playback modes, the third function includes a selection function to select an audio source of the audio to be played, and the fourth function includes a function which is dependent on a current setting of the third function.

2. The user interface arrangement of claim 1, wherein the user interface arrangement is operatively connected to a processor, and the processor is operatively connected to a memory and a communications interface, the memory comprising instructions which are executable by the processor, and the communications interface configured for wired or wireless communication with one or more audio playback devices of the plurality of audio playback devices, and
   wherein a rotation of the first rotatable knob around the first rotational axis causes a first signal to be transmitted to the processor for controlling the first function, an axial displacement of the first rotatable knob in the first axial direction causes a second signal to be transmitted to the processor for controlling the second function, a rotation of the second rotatable knob around the second rotational axis causes a third signal to be transmitted to the processor for controlling the third function, and an axial displacement of the second rotatable knob in the second axial direction causes a fourth signal to be transmitted to the processor for controlling the fourth function.

3. The user interface arrangement of claim 2, wherein the first function includes a volume function, the second function includes a selection function to select between a plurality of playback modes, the third function includes a selection function to select an audio source of the audio to be played, and the fourth function includes a function which is dependent on a current setting of the third function.

4. The user interface arrangement of claim 3, wherein a first playback mode of the plurality of playback modes includes playing audio at one single audio playback device of the plurality of audio playback devices, and a second playback mode of the plurality of playback modes includes playing audio at two or more of the plurality of audio playback devices.

5. An audio playback device comprising the user interface arrangement of claim 4.

6. The audio playback device of claim 5, wherein the audio playback device is a master audio playback device in the networked audio playback system, the plurality of audio playback devices in the networked audio playback system including the master audio playback device and a plurality of slave audio playback devices configured to be controlled by the master audio playback device.

7. The audio playback device according of claim 5, wherein the audio playback device is a speaker.

8. An audio playback device comprising the user interface arrangement of claim 3.

9. The audio playback device of claim 8, wherein the audio playback device is a master audio playback device in the networked audio playback system, the plurality of audio playback devices in the networked audio playback system including the master audio playback device and a plurality of slave audio playback devices configured to be controlled by the master audio playback device.

10. The audio playback device of claim 8, wherein the audio playback device is a speaker.

11. An audio playback device comprising the user interface arrangement of claim 2.

12. The audio playback device of claim 11, wherein the audio playback device is a master audio playback device in the networked audio playback system, the plurality of audio playback devices in the networked audio playback system including the master audio playback device and a plurality of slave audio playback devices configured to be controlled by the master audio playback device.

13. The audio playback device of claim 11, wherein the audio playback device is a speaker.

14. An audio playback device comprising the user interface arrangement of claim 1.

15. The audio playback device of claim 14, wherein the audio playback device is a master audio playback device in the networked audio playback system, the plurality of audio playback devices in the networked audio playback system including the master audio playback device and a plurality of slave audio playback devices configured to be controlled by the master audio playback device.

16. The audio playback device of claim 14, wherein the audio playback device is a speaker.

17. An audio playback device comprising the user interface arrangement of claim 1.

18. The audio playback device of claim 17, wherein the audio playback device is a master audio playback device in the networked audio playback system, the plurality of audio playback devices in the networked audio playback system including the master audio playback device and a plurality of slave audio playback devices configured to be controlled by the master audio playback device.

19. The audio playback device of claim 17, wherein the audio playback device is a speaker.

20. A user interface panel comprising the user interface arrangement of claim 1.

21. The user interface panel of claim 20, wherein the user interface panel is attachable to a house equipment.

22. The user interface panel of claim 21, wherein the house equipment is a wall.

23. The user interface arrangement of claim 1, wherein the user interface arrangement is configured to control multiple functions of two or more audio playback devices of the plurality of playback devices in the networked audio playback system.

* * * * *